United States Patent
Celi et al.

(10) Patent No.: US 11,995,917 B2
(45) Date of Patent: May 28, 2024

(54) SYSTEMS AND METHODS FOR DETECTING A SLIP, TRIP OR FALL

(71) Applicant: Sensormatic Electronics, LLC, Boca Raton, FL (US)

(72) Inventors: Joseph Celi, Boca Raton, FL (US); Gopi Subramanian, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 185 days.

(21) Appl. No.: 17/470,350

(22) Filed: Sep. 9, 2021

(65) Prior Publication Data

US 2023/0074123 A1    Mar. 9, 2023

(51) Int. Cl.
*G06V 40/20* (2022.01)
*G06T 7/246* (2017.01)
(Continued)

(52) U.S. Cl.
CPC .............. *G06V 40/23* (2022.01); *G06T 7/248* (2017.01); *G06T 7/73* (2017.01); *G08B 21/043* (2013.01); *G08B 21/0476* (2013.01); *G08B 21/182* (2013.01); *G06T 2207/10016* (2013.01); *G06T 2207/30196* (2013.01)

(58) Field of Classification Search
CPC ........ G06V 40/23; G06V 20/44; G06V 20/52; G06V 40/161; G06V 40/103; G06T 7/248; G06T 7/73; G06T 2207/10016; G06T 2207/30196; G08B 21/043; G08B 21/0476; G08B 21/182
See application file for complete search history.

(56) References Cited

U.S. PATENT DOCUMENTS

| | | | |
|---|---|---|---|
| 7,110,569 B2* | 9/2006 | Brodsky | G08B 13/19641 348/E7.086 |
| 2006/0291694 A1* | 12/2006 | Venetianer | G06V 40/103 382/103 |

(Continued)

OTHER PUBLICATIONS

Gasparrini et al., "A Depth-Based Fall Detection System Using a Kinect® Sensor," Sensors, Feb. 11, 2014, vol. 14, No. 2, pp. 2756-2775.

(Continued)

*Primary Examiner* — Amara Abdi
(74) *Attorney, Agent, or Firm* — ArentFox Schiff LLP

(57) ABSTRACT

Disclosed herein are apparatuses and methods for detecting a slip, trip or fall event in an environment and sending an alert of the event. An implementation may comprise detecting, in image frames captured by a camera, when an object enters a region of interest, tracking movements of the object, and determining that the object is in a fall-zone. The fall-zone may be specified by a set of line segments, each line segment being defined by points that lie in the region of interest. The implementation may further comprise, when the object is in the fall-zone, recording the position of the object, detecting a slip, trip or fall event when the object transitions from a first position above a predetermined height threshold to a second position below the predetermined height threshold, a pose of the object indicates that the object is lying down, or the object transitions from a vertical to horizontal pose, and sending the alert.

20 Claims, 15 Drawing Sheets

(51) Int. Cl.
*G06T 7/73* (2017.01)
*G08B 21/04* (2006.01)
*G08B 21/18* (2006.01)

(56) References Cited

U.S. PATENT DOCUMENTS

| | | | | |
|---|---|---|---|---|
| 2013/0070091 A1* | 3/2013 | Mojaver | ................ | H04N 23/45 |
| | | | | 348/169 |
| 2015/0317890 A1* | 11/2015 | Ten Kate | .............. | A61B 5/1117 |
| | | | | 702/141 |
| 2020/0211154 A1* | 7/2020 | Ng | ......................... | G06V 40/23 |
| 2021/0203887 A1* | 7/2021 | Nathan | .................. | H04N 7/188 |
| 2021/0358637 A1* | 11/2021 | Devdas | .................. | G16H 40/67 |

OTHER PUBLICATIONS

International Search Report in PCT/US2022/074983, dated Nov. 30, 2022, 4 pages.

* cited by examiner

Example 1400

Running agent via use-camera

./build/bin/use-camera -t video -i ./tests/test_data/video/slip-fall-3.mp4 -m slip-fall -c 10 -s 1 --fall_zone 1280 720 3 10 20 20 40 60 100 -a http://application:8080

Fall zone definition
Width of configuration image
Height of configuration image
Number of points
 pt1_x
 pt1_y
 pt2_x
 pt2_y
 pt3_x
 pt3_y

Fig. 14

Example of a Payload

Once a fall is detected the slip-fall agent will post the following payload to the upper levels of the VisionWorks stack.

```
{
  "siteId": 1,
  "cameraId": 8,
  "eventType": "SF",
  "context": {
    "slip-fall": {
      "ts": "2021-04-13T14:11:22.995+0000"
    }
  }
}
```

Fig. 15

SYSTEMS AND METHODS FOR DETECTING A SLIP, TRIP OR FALL

TECHNICAL FIELD

The described aspects relate to security systems that comprise object detection features to detect a slip, trip or fall.

BACKGROUND

Conventional systems often fail to provide timely detection and timely recognition of the seriousness of a slip, trip or fall event. Thus, alerts may be delayed, may not be recognized by security personnel as being emergencies, etc. Accordingly, there exists a need for improvements in such vision systems with detections of slips, trips or falls.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate generally to vision systems that may be used for intervention when a potential injury event occurs, and more particularly to detection of slips, trips, or falls of objects.

An example implementation includes a method for detecting a slip, trip or fall event and sending an alert of the event, the method comprising: detecting, in a plurality of image frames captured by a camera, when an object enters a region of interest; tracking movements of the object in the region of interest using the plurality of image frames; determining that the object is in a fall-zone based on the tracking of the movement, the fall-zone being specified by a set of line segments, each line segment being defined by points that lie in the region of interest; and when the object is in the fall-zone, recording the position of the object, detecting a slip, trip or fall event when at least one of the following events occurs: the object transitioned from a first position above a predetermined height threshold to a second position below the predetermined height threshold, a pose of the object indicates that the object is lying down, and the object transitioned from a vertical pose to a horizontal pose, and sending an alert of the detected slip, trip or fall event to one or more user devices of one or more predetermined recipients of the alert.

Another example implementation includes an apparatus for detecting a slip, trip or fall event and sending an alert of the event, comprising a memory storing instructions and a processor communicatively coupled with the memory and configured to execute the instructions. The processor executes the instructions to detect, in a plurality of image frames captured by a camera, when an object enters a region of interest; track movements of the object in the region of interest using the plurality of image frames; determine that the object is in a fall-zone based on the tracking of the movement, the fall-zone being specified by a set of line segments, each line segment being defined by points that lie in the region of interest; and when the object is in the fall-zone, record the position of the object, detect a slip, trip or fall event when at least one of the following events occurs: the object transitions from a first position above a predetermined height threshold to a second position below the predetermined height threshold, a pose of the object indicates that the object is lying down, and the object transitions from a vertical pose to a horizontal pose, and send an alert of the detected slip, trip or fall event to one or more user devices of one or more predetermined recipients of the alert.

Another example implementation includes an apparatus for detecting a slip, trip or fall event and sending an alert of the event, comprising means for detecting, in a plurality of image frames captured by a camera, when an object enters a region of interest. The apparatus further includes means for tracking movements of the object in the region of interest using the plurality of image frames. The apparatus further includes means for determining that the object is in a fall-zone based on the tracking of the movement, the fall-zone being specified by a set of line segments, each line segment being defined by points that lie in the region of interest. The apparatus further includes means for, when the object is in the fall-zone, recording the position of the object. The apparatus further includes means for detecting a slip, trip or fall event when at least one of the following events occurs: the object transitioned from a first position above a predetermined height threshold to a second position below the predetermined height threshold, a pose of the object indicates that the object is lying down, and the object transitioned from a vertical pose to a horizontal pose. The apparatus further includes means for sending an alert of the detected slip, trip or fall event to one or more user devices of one or more predetermined recipients of the alert.

Another example implementation includes a computer-readable medium (e.g., a non-transitory computer-readable medium) for detecting a slip, trip or fall event and sending an alert of the event, executable by a processor to detect, in a plurality of image frames captured by a camera, when an object enters a region of interest, and track movements of the object in the region of interest using the plurality of image frames. The instructions are further executable to determine that the object is in a fall-zone based on the tracking of the movement, the fall-zone being specified by a set of line segments, each line segment being defined by points that lie in the region of interest. The instructions are further executable to, when the object is in the fall-zone, record the position of the object, detect a slip, trip or fall event when at least one of the following events occurs: the object transitions from a first position above a predetermined height threshold to a second position below the predetermined height threshold, a pose of the object indicates that the object is lying down, and the object transitions from a vertical pose to a horizontal pose. The instructions are further executable to send an alert of the detected slip, trip or fall event to one or more user devices of one or more predetermined recipients of the alert.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 14 is a diagram of an example of an annotation of a fall-zone via a use-camera parameter, in accordance with exemplary aspects of the present disclosure.

FIG. 15 is an example illustrating a payload, in accordance with exemplary aspects of the present disclosure.

DETAILED DESCRIPTION

Figure 1:
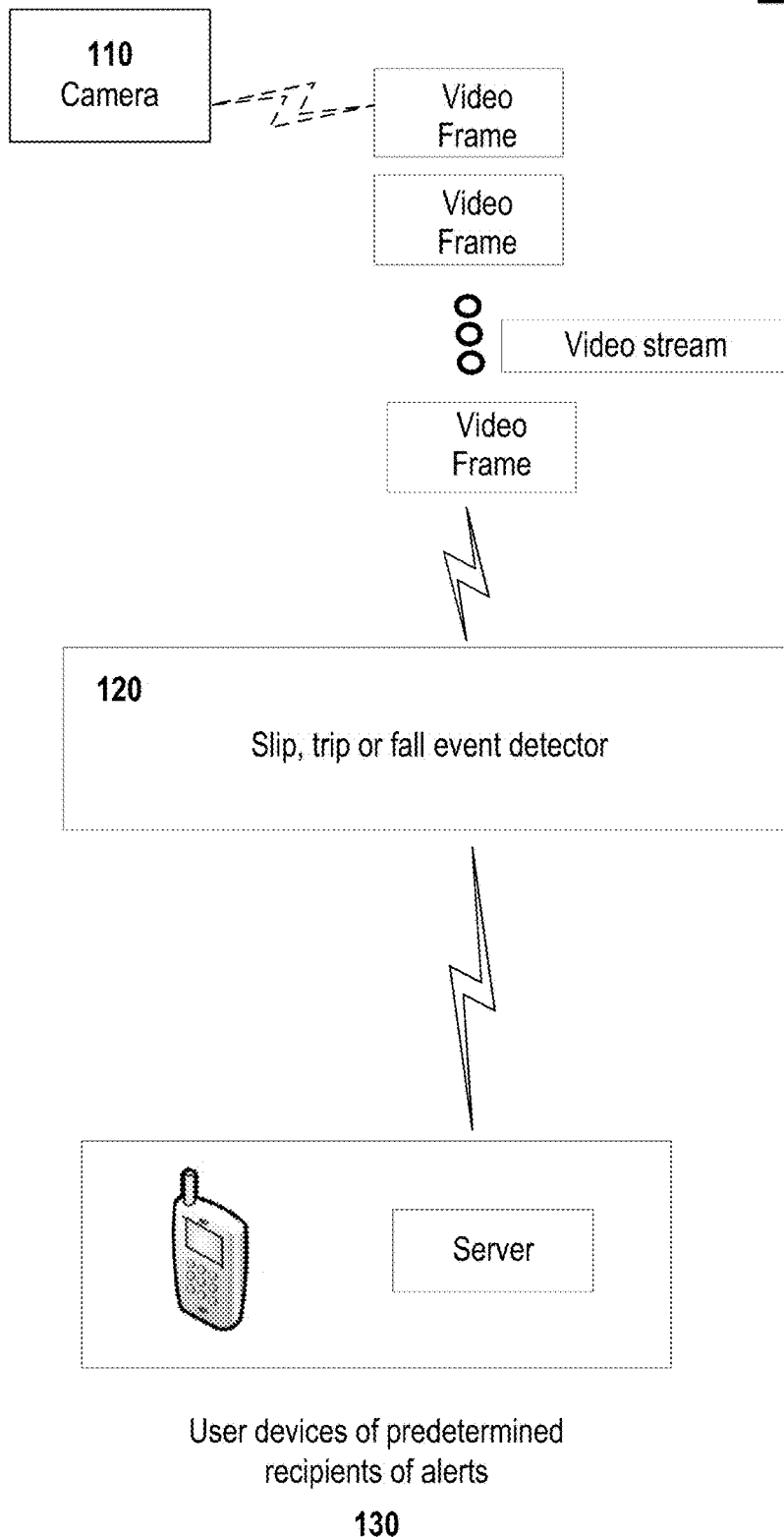
FIG. 1 is a diagram of a system for detecting a slip, trip or fall event, in accordance with exemplary aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Vision systems may be used to detect objects in an environment and track the objects within a region of interest. In some implementations, for example, vision systems may include object detection and tracking capabilities. For instance, in some cases, the object may be a person, and the object tracking may be used for determining when a person slips, trips or falls. Detection of slips, trips and falls is important for fields such as security, injury prevention, reduction of financial liability, reduction of damage to reputation of an institution, etc. For example, a user of a security system may be interested in knowing when people enter and exit a region of interest. A camera (such as an Internet Protocol (IP) camera) may be used to monitor the region of interest, track people as they traverse in and out of the region of interest, and detect when a person may have slipped, tripped or fallen. If an event occurs within an area being monitored, timely intervention may assist in reducing injury, liability, etc.

The present disclosure includes apparatuses and methods that detect a slip, trip or fall event and send an alert to one or more user devices of one or more predetermined recipients. The fall-zone comprises a height threshold or a set of line segments with each line segment being defined by points that lie in a region of interest. A slip, trip or fall event is defined as an event in which the object or a predefined portion of the object is below the height threshold or at least one of the line segments of the fall-zone. For instance, the slip, trip, or fall event may be an event in which a person or a portion of the person, e.g., the head of the person, is below the height threshold or at least one of the line segments in the fall-zone. In one aspect, the method is based on a fall-zone predetermined by a user and annotated accordingly via a user interface, e.g., a graphical user interface (GUI) being used for setting up the vision system, e.g., a surveillance system used to monitor an environment. Then, the vision system monitors the fall-zone to determine when an object, e.g., a person, enters the fall-zone and slips, trips, or falls. When any slip, trip, or a fall is detected, the method sends an alert to one or more user devices of one or more predetermined recipients. For example, a store may have a vision system including any number of cameras for monitoring different parts of the store. For each camera, the region of interest may be the full frame that can be captured by the camera. A particular area within the region of interest may be annotated as the fall-zone, as described below in conjunction with FIG. 3. For instance, the fall-zone for a given camera may be annotated to include entrances/exits to the store, near an area where water may be expected to be present during rain, and so on. If a customer slips, trips or falls in the fall-zone, the security personnel may then be notified, e.g., via an alert (e.g., an email or text message) sent to a cell phone, server, etc.

FIG. 1 is a diagram of a system 100 for detecting a slip, trip or fall event. The system comprises a camera 110 (e.g., an internet protocol (IP) camera), a slip, trip or fall event detector 120, and an alert recipient 130 (e.g., a server, user device). The communication between the slip, trip or fall event detector 120 and the user device associated with the predetermined recipient may be performed via a communication network (Internet, 4G/5G network, enterprise network, or any other standard network). The slip, trip or fall event detector 120 may be implemented as a module of the IP camera 110 or on another device (e.g., server) communicatively coupled to the IP camera 110 for receiving video streams from the IP camera 110. The video stream includes a plurality of video frames. For example, the IP camera may capture 30 frames per second. Then, for each second, the video stream includes the 30 captured video frames.

Figure 2:
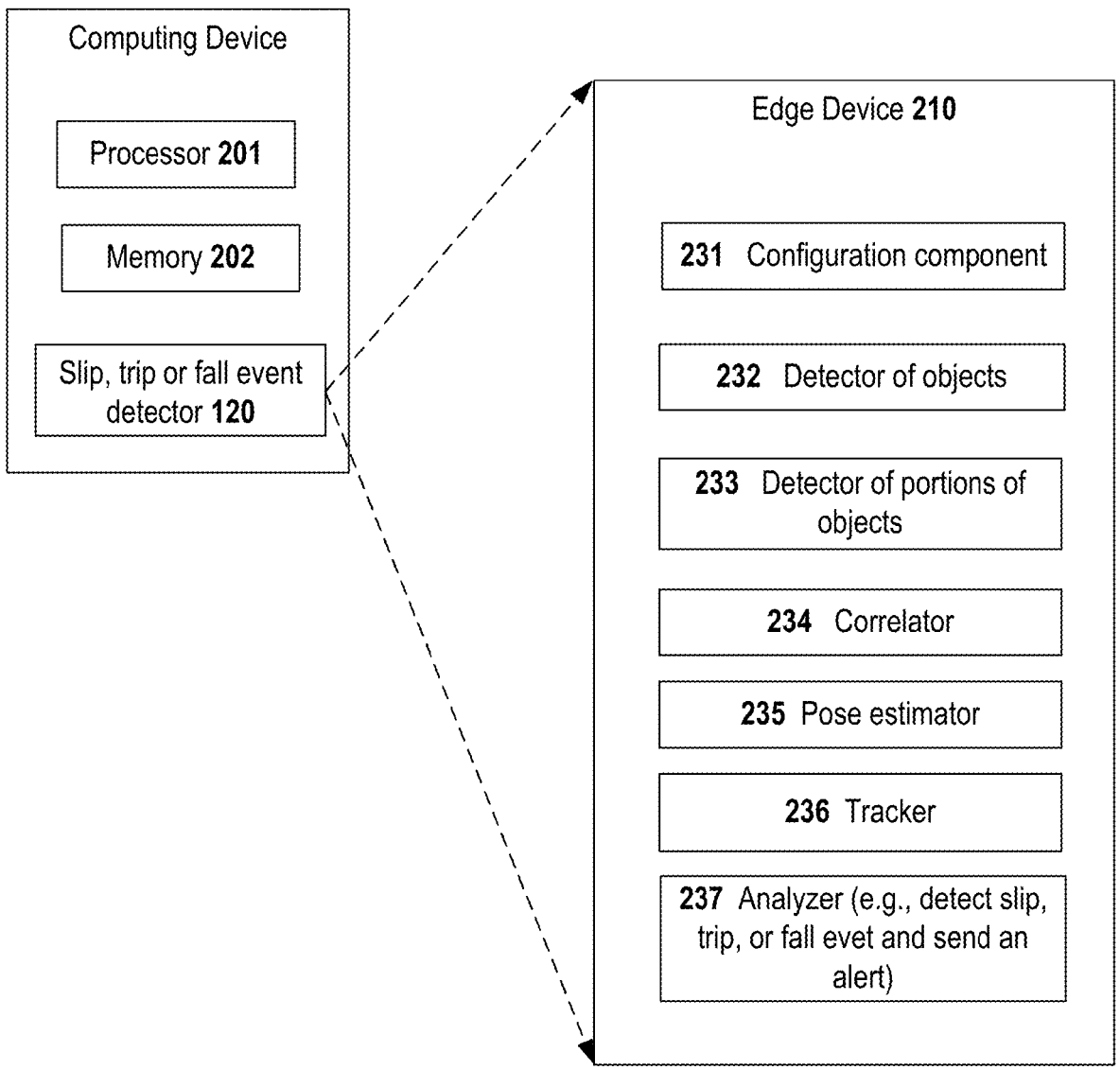
FIG. 2 is a block diagram of a computing device for detecting a slip, trip or fall event, in accordance with exemplary aspects of the present disclosure.

FIG. 2 is a block diagram of a computing device 200 for detecting a slip, trip or fall event. For example, the slip, trip or fall event detector 120 may be implemented in an edge device 210. In one aspect, the edge device 210 may be part of the camera or can be separate from the camera. In another aspect, the components of the edge device 210 can be in a server. The edge device 210 may include a configuration component 231 for configuring a fall-zone within a region of interest, a detector of objects 232, a detector of any number of pre-determined portions of the object 233, a correlator 234 for correlating portions of objects with respective objects, an estimator 235 for estimating poses of objects, a tracker 236 for tracking objects and their respective pre-determined portions, and an analyzer 237 for performing analysis on tracked objects to determine when a slip, trip or fall event is detected and sending an alert.

Figure 3:
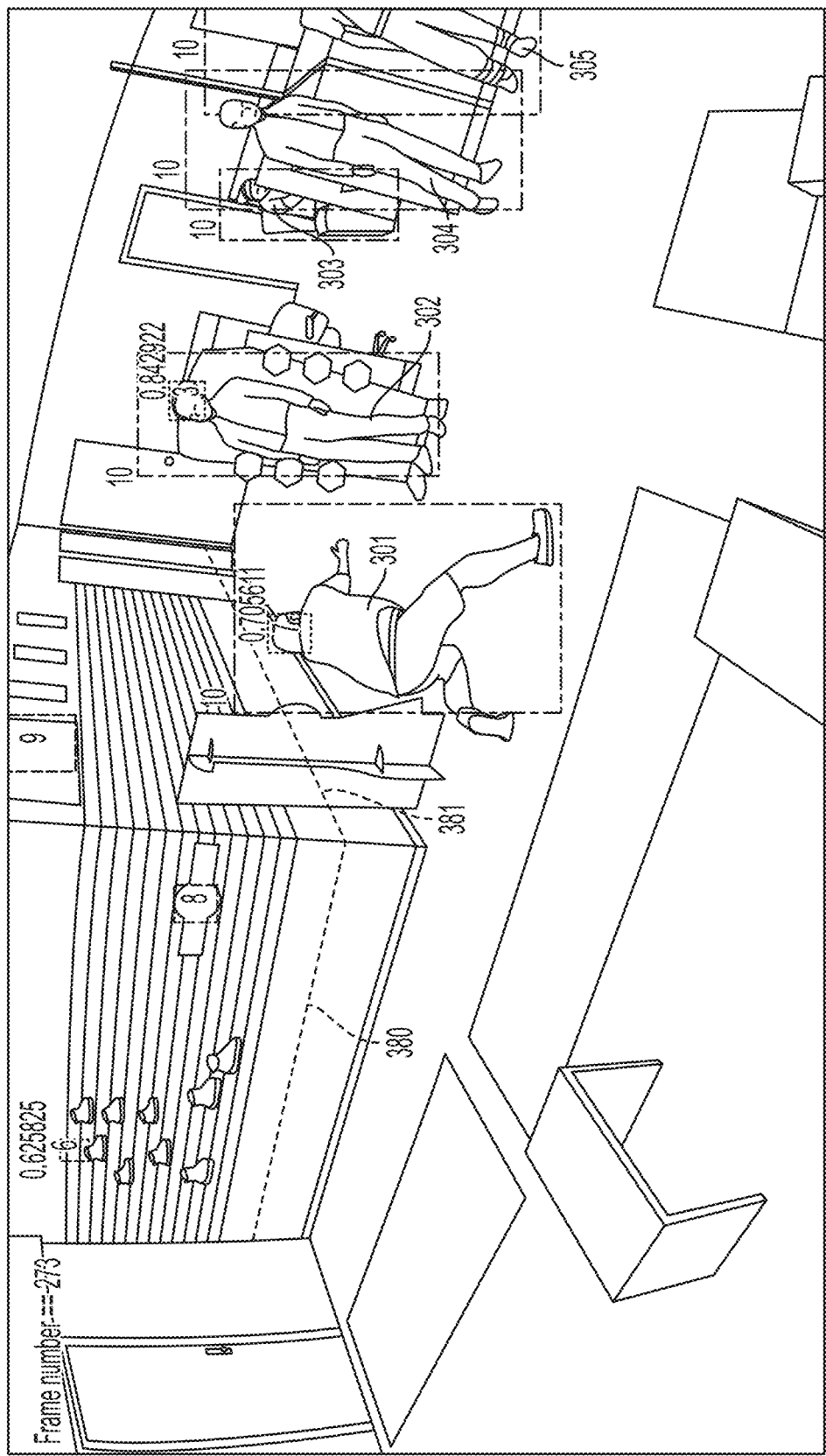
FIG. 3 is a diagram of an example of a fall-zone and objects in the fall-zone, in accordance with exemplary aspects of the present disclosure.

FIG. 3 is a diagram of an example 300 of a fall-zone and objects in the fall-zone. The fall-zone may comprise a height threshold or a set of line segments, each line segment being defined by points that lie in a region of interest. The fall-zone may be annotated using a setup Graphical User Interface (GUI). The height threshold or the set of line segments is chosen such that when a portion of an object dips below the height threshold or the at least one of the line segments, an alert is generated and sent to one or more user devices of one or more predetermined recipients. In one example, the region of interest may be a full-frame, or a partial-frame as viewed by the camera (e.g., an IP camera). The fall-zone is annotated by a user, using the GUI, within the region of interest. Further details of the alert and fall-zone are described in conjunction with FIG. 14 and FIG. 15.

Figure 4:
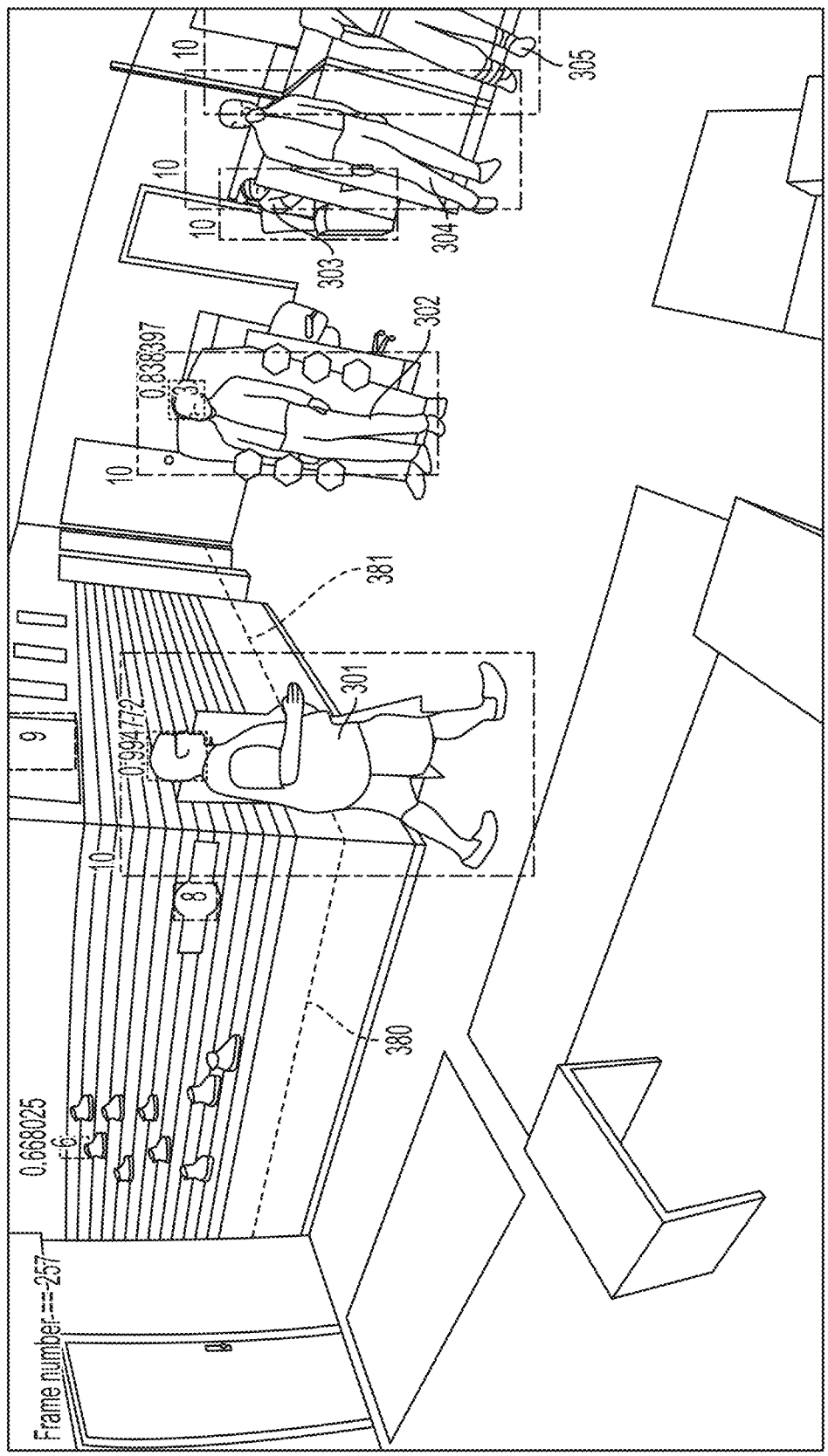
FIG. 4 is a diagram of person in a first pose within the fall-zone and persons 302-305 outside the fall-zone, in accordance with exemplary aspects of the present disclosure.
Figure 5:
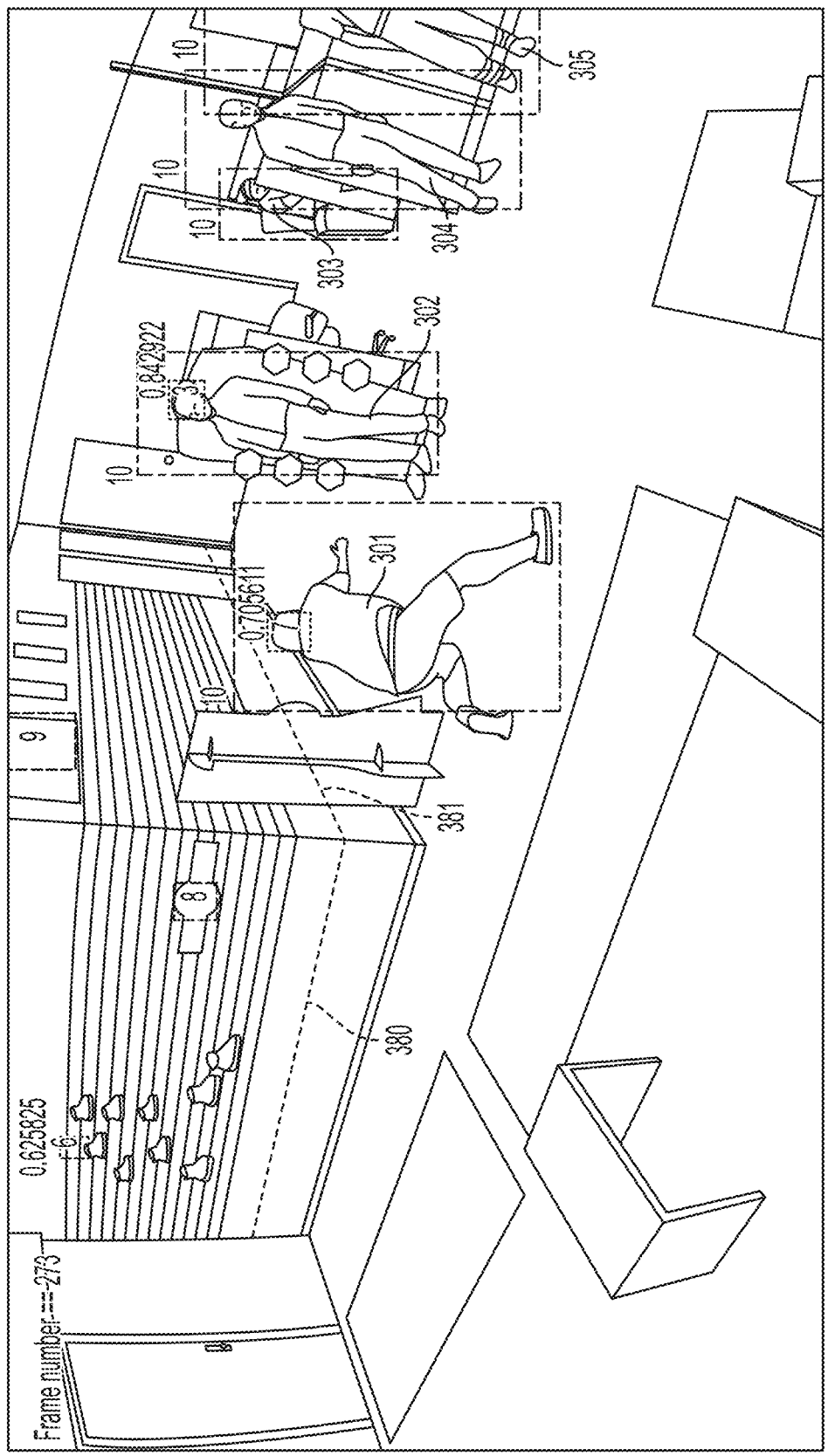
FIG. 5 is a diagram of a person in a second pose in the fall-zone, in accordance with exemplary aspects of the present disclosure.
Figure 6:
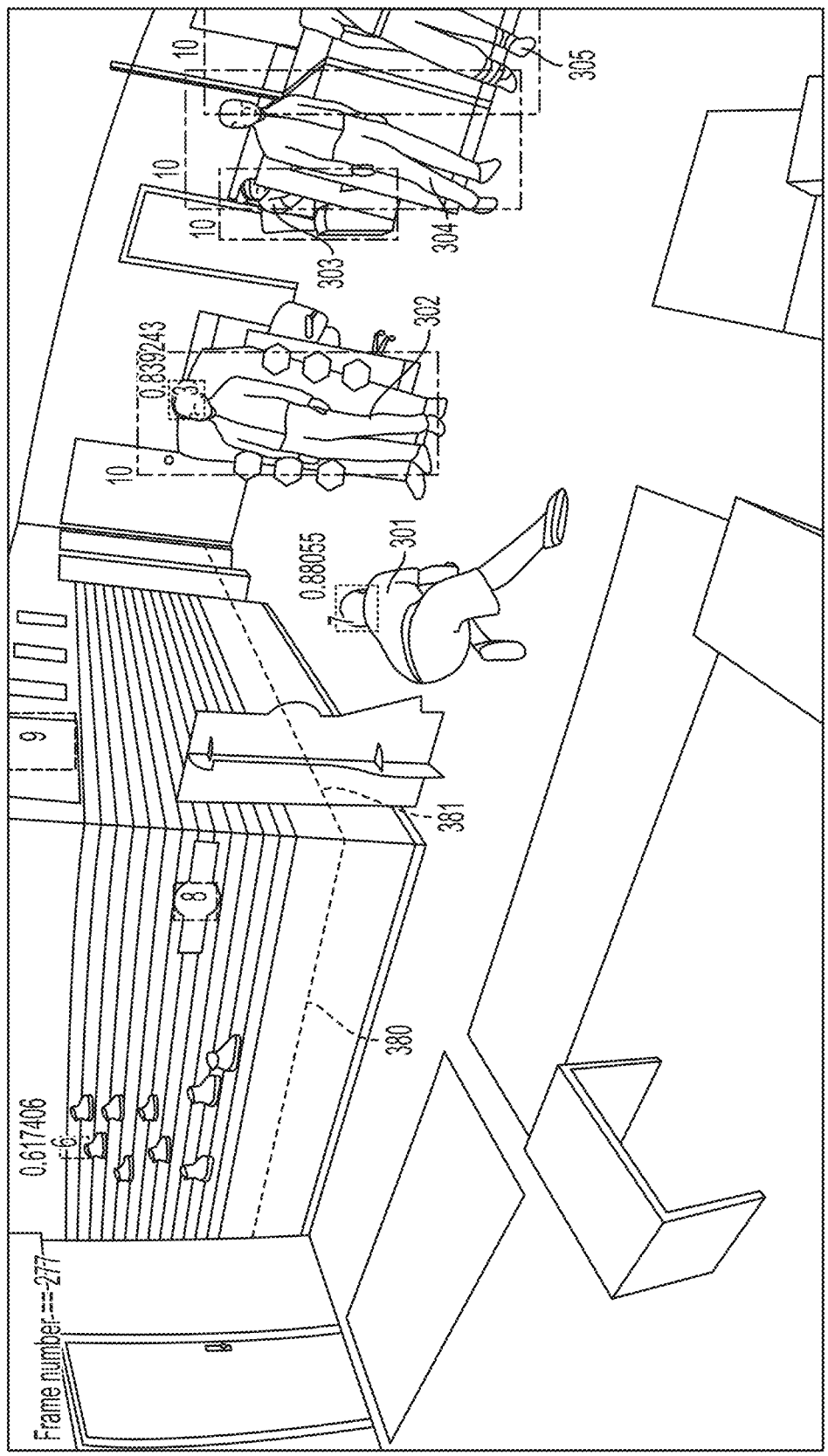
FIG. 6 is a diagram of a person in a third pose in the fall-zone, in accordance with exemplary aspects of the present disclosure.

FIG. 3 further includes persons 301, 302, 303, 304 and 305. Person 301 is shown within the fall-zone (which includes line segments 380 and 381) and persons 302-305 outside the fall-zone. FIG. 3 further includes various objects throughout the region of interest, e.g., objects 6, 8 and 9 which are located on walls above the height thresholds 380 or 381. The objects 6, 8 and 9 are not tracked for the purpose of detecting slips, trips and falls. However, the person 301 is residing below the height threshold 381 and is to be tracked. A tracking software may be used to identify objects and track the images of the objects using a plurality of captured video frames. For clarity, the boxes 10 around the objects indicate people identified within a frame. The box 7 indicates a portion of person 301 and box 3 indicates a portion of person 302. As mentioned above, person 301 is to be tracked. In one aspect, the box 7 (e.g., around the head of person 301) is also tracked. FIG. 4-FIG. 6 are used below to illustrate the tracking of the person 301.

FIG. 4 is a diagram of person 301 in a first pose within the fall-zone and persons 302-305 outside the fall-zone. The person 301 is moving in the fall-zone from an area near the line segment 380 towards the area near the line segment 381. Therefore, the person 301 is to be tracked as he moves in the region of interest until he exits the fall-zone. FIG. 5 is a diagram that illustrates a person 301 in a second pose in the fall-zone. For example, with the box 7 being below the line 381. FIG. 6 is another diagram that illustrates a person 301 in a third pose in the fall-zone. In this case, the box 7 is near the ground, even further below the line 381. In order to detect when a slip, trip or fall event occurs, various portions of the person may be tracked and a determination may be made as to the pose of the person. The pose may be determined using any type of standard model known in the art.

It is notable that the portion of the person to be tracked may be chosen by the user. In one example, the user may select the boxes 7 and 10 to be the same, i.e., the portion is the entire person. In another example, the box 7 is placed around the head. Then, the position of the head may be tracked separately by the tracking software.

Figure 7:
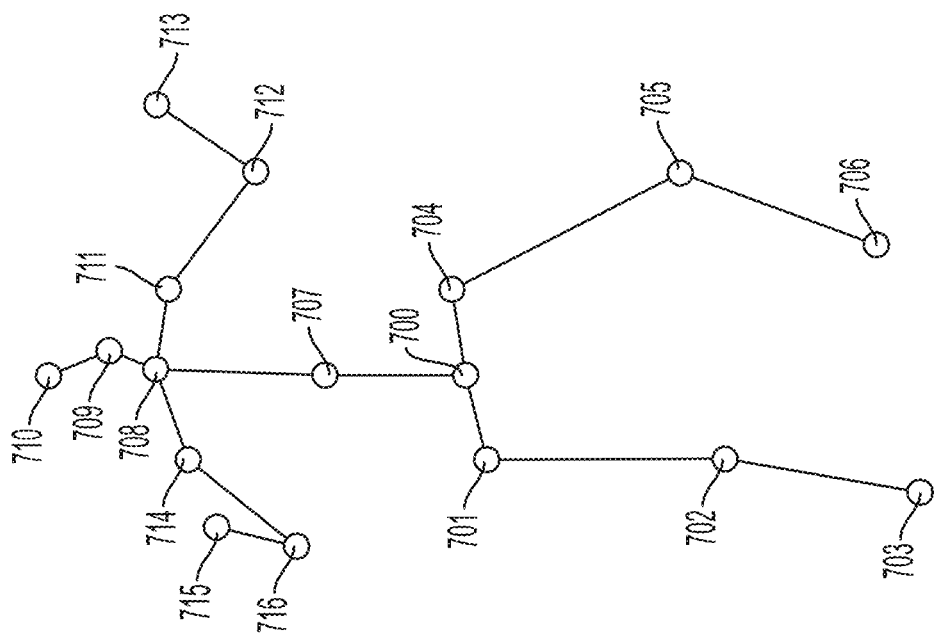
FIG. 7 is an example 3D model of a person suitable for determining the pre-defined portion of the person, in accordance with exemplary aspects of the present disclosure.

FIG. 7 is an example 3D model of a person suitable for determining the pre-defined portion of the person. For example, the 3D model may be used to identify the pre-define portions of person 301 of FIG. 3. That is, 3D model is provided such that points and line segments are used to illustrate portions of the person 301. FIG. 7 includes a bottom torso 700, left hip 701, left knee 702, left foot 703, right hip 704, right knee 705, right foot 706, center torso 707, upper torso 708, neck base 709, center head 710, right shoulder 711, right elbow 712, right hand 713, left shoulder 714, left elbow 715, and left hand 716. Thus, portions of the body are represented as dots and interconnections between the various portions of the body are shown as line segments. This 3D model is used to determine the pose of a person for differentiating between slip, trip, fall events and intentional changes of pose (e.g., to tie shoes), as described below.

Figure 8:
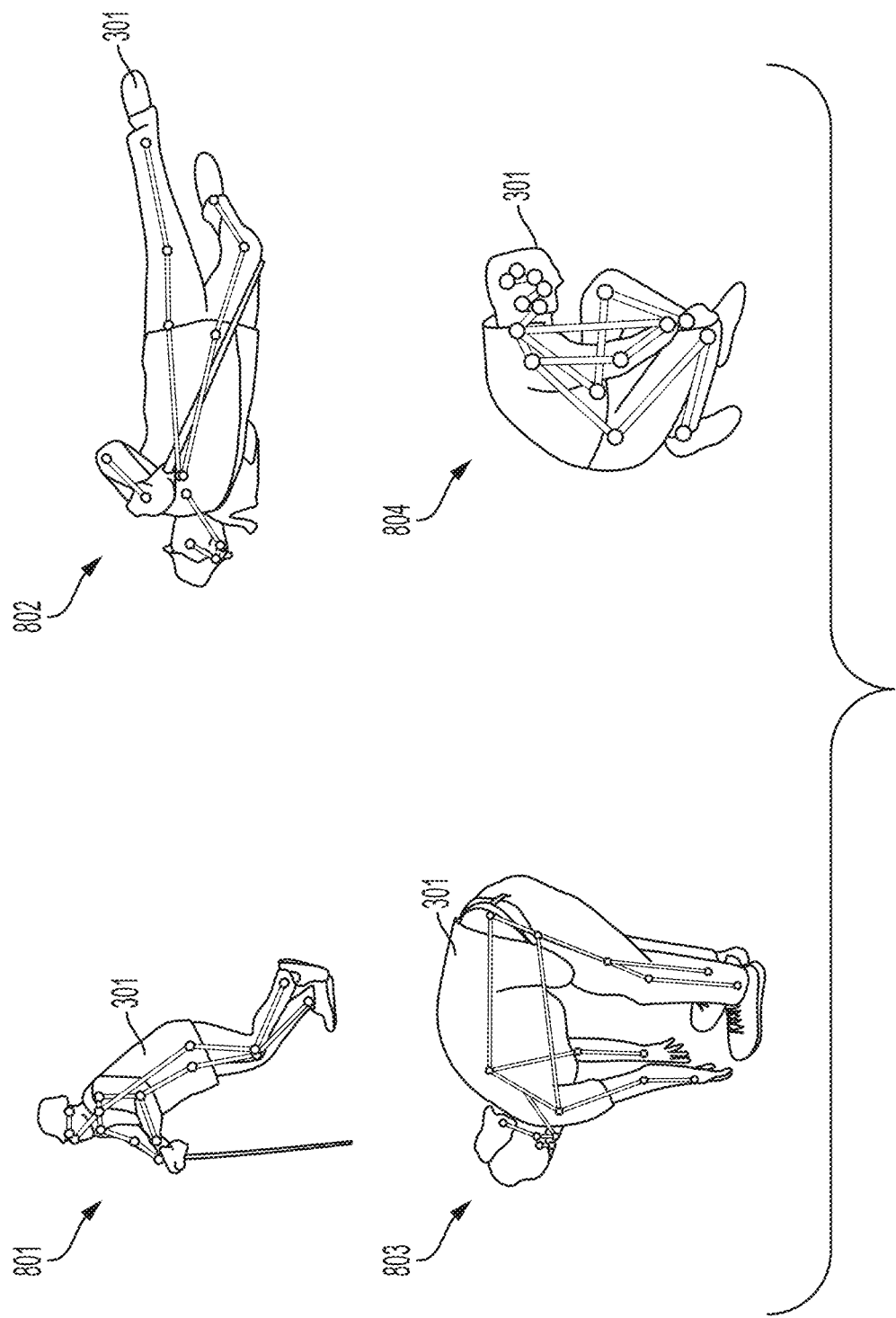
FIG. 8 is a diagram of a person in various positions, in accordance with exemplary aspects of the present disclosure.

FIG. 8 is a diagram of person 301 in various positions. Using the 3D model of FIG. 7, when the person is standing vertically, as shown in 801, the center head 710 is above the neck base 709. When the person is lying down, as shown in 802, the center head 710 is below the neck base 709. Moreover, the other portions of the body are about the same distance from the ground. When the person is bending, as shown in 803, the right shoulder 711, right elbow 712, right hand 713, left shoulder 714, left elbow 715 and left hand 716 positions and left hip 701, left knee 702, left foot 703, right hip 704, right knee 705 right foot 706 positions are at about the same distance from the ground and make a specific pose indicative of the person intentionally bending down. Similarly, when the person is bending to tie their shoes, as shown in 804, the relationship of the various portions is indicative of intentional bending. For example, a person in the fall-zone may simply bend down to pick up an object, tie shoes, etc. These scenarios are used to identify a person who fell, slipped or fallen, e.g., 802. In one aspect, a learning algorithm may be used to improve the accuracy of the slip, trip or fall event detection. Therefore, the detector of the present disclosure is configured to detect the slip, trip or fall event using the 3D model to differentiate between scenarios in which the person intentionally changes his/her position and scenarios in which the person changes his/her position due to a slip, a trip or a fall. The pose of the person is used to determine whether or not the person has slipped, tripped or fallen. When the person has slipped, tripped or fallen, an alert is generated and sent to user devices of one or more recipients. For example, the predetermined recipient may include security personnel.

Figure 9:
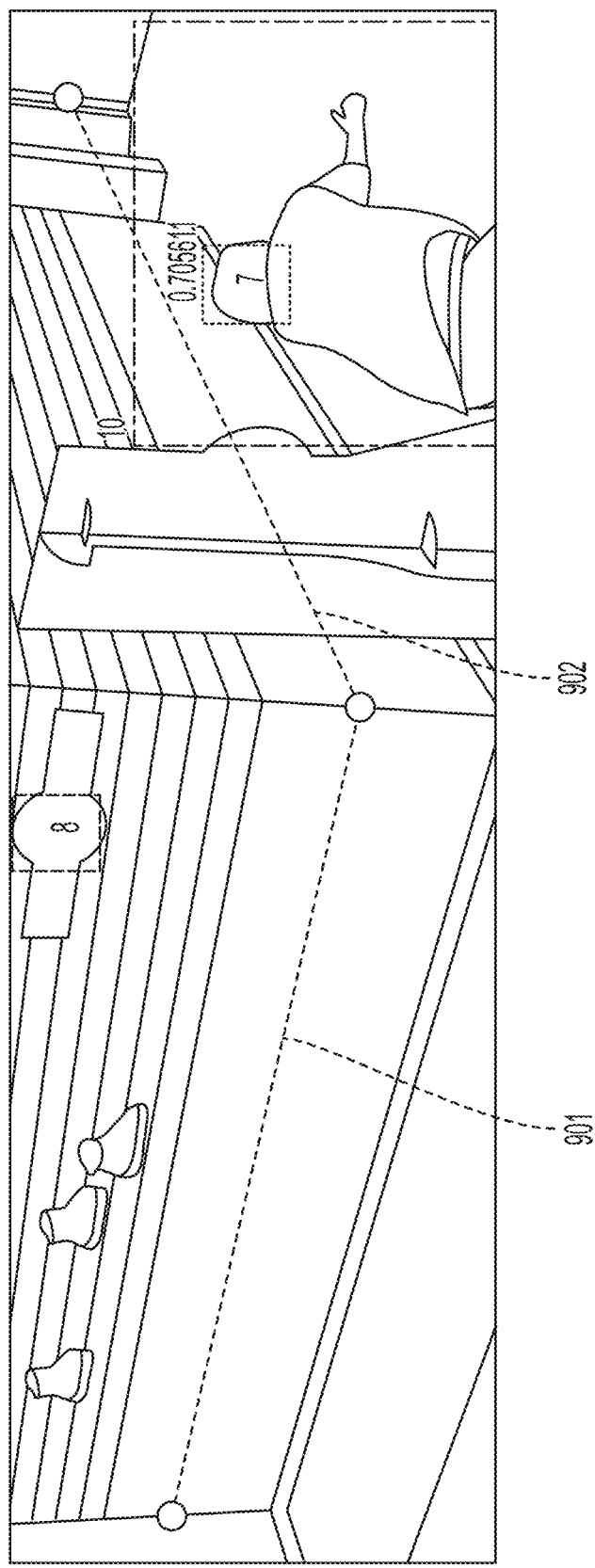
FIG. 9 is a diagram illustrating a fall-zone, in accordance with exemplary aspects of the present disclosure.

FIG. 9 is an example diagram 900 illustrating a fall-zone being designated. FIG. 14 is a diagram of an example 1400 of an annotation of the fall-zone via a use-camera parameter. The first two values shown in FIG. 14, e.g., 1280 and 720, are the width of the frame and height of the frame, respectively, used to plot the fall-zone of FIG. 9. Then, the 2D coordinate values of end points of each of the line segments is listed. For the example of FIG. 9, there are two line segments 901 and 902. The first point is (188, 219), the second point is (542, 300), and the third point is (807, 171). The first line segment 901 connects the first point and the second point. The second line segment 902 connects the second point and the third point.

In some aspects, the fall-zone may be predetermined by a user, e.g., security personnel. The detector of the slip, trip or fall event may receive the defined fall-zone in a manual or automated manner. For example, a use-camera command line parameter may be used to provide the list of values to the detector.

Figure 10:
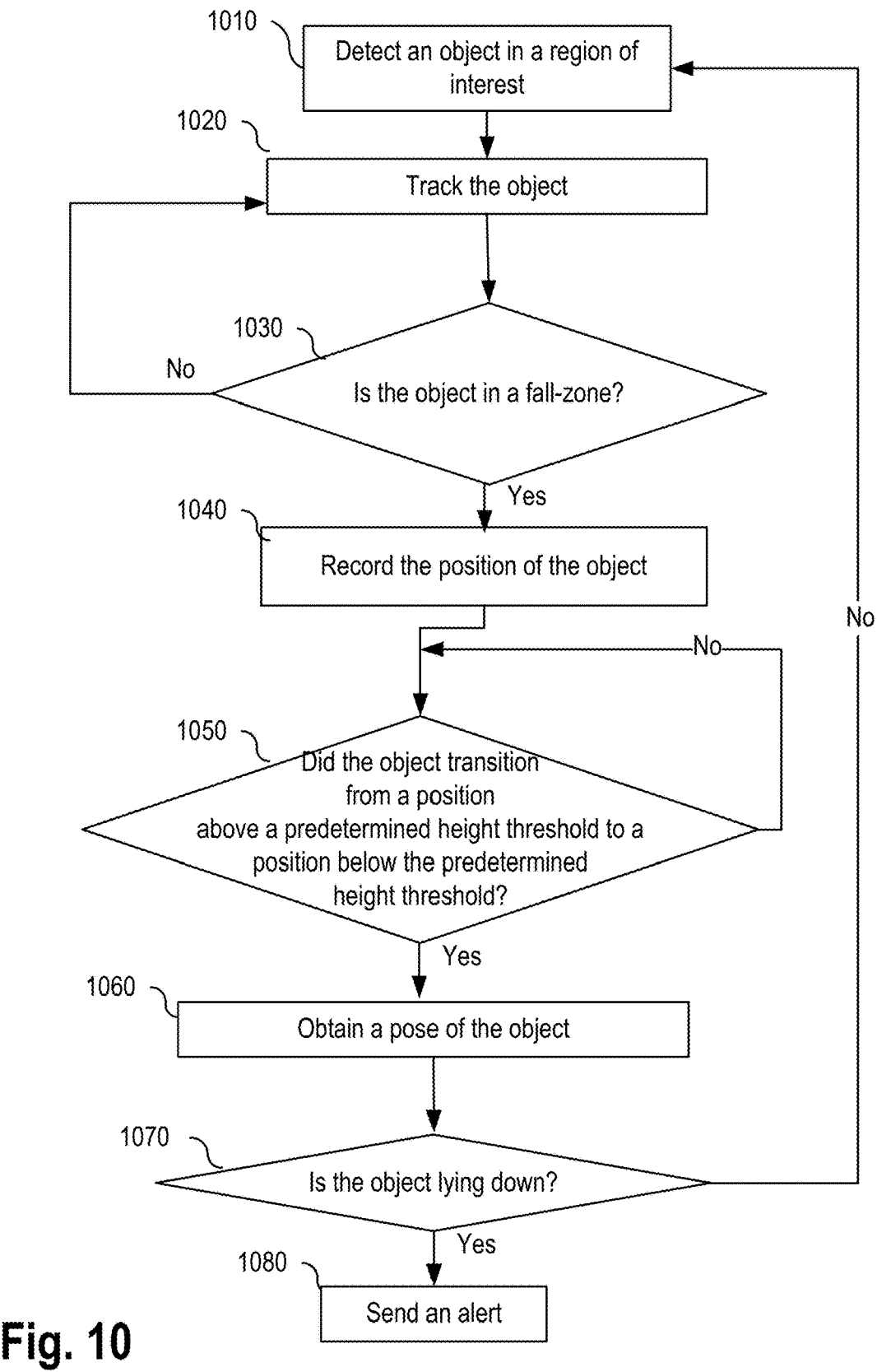
FIG. 10 is a flowchart illustrating a method for detecting a slip, trip or fall event, in accordance with exemplary aspects of the present disclosure.

FIG. 10 is a flowchart illustrating a method 1000 for detecting a slip, trip or fall event. In one aspect, referring to FIG. 2 and FIG. 10, in operation, computing device 200 may perform method 1000 for detecting a slip, trip or fall event by processor 201 and/or memory 202. In one aspect, the slip, trip or fall event detector is implemented in a camera (e.g., an IP camera) or a device, e.g., an edge device, communicatively coupled with the IP camera.

At block 1010, the method 1000 detects an object in a region of interest. The region of interest may be the entire frame being captured by the camera or a portion of the frame, as set by the user. The object may be detected using an object detection software as known in the art and executed by the processor 201.

At block 1020, the method 1000 tracks the object, e.g., using an object tracking software. For example, as the object moves within the region of interest, the method tracks the object by comparing images of the object in a plurality of frames. The software for detecting and tracking the object may be implemented together or separately in different components of the IP camera or by the edge device communicatively coupled with the IP camera. Moreover, the tracking of the object may be performed by the processor 201, e.g., executing tracking software as known in the art.

At block 1030, the method 1000 determines whether or not the object is in a fall-zone. The fall-zone is specified by a height threshold or a set of line segments, with each line segment being defined by points that lie in the region of interest. The object is in the fall-zone, when the image of the object (or a certain portion of the object) in the frame intersects any portion of at least one of the line segments of the fall-zone. When the object is in the fall-zone, the method proceeds to block 1040. Otherwise, the method proceeds to block 1020 to continue tracking the object.

At block 1040, when the object is in the fall-zone, the method 1000 records the position of the object.

At block 1050, the method 1000 determines whether or not the object transitioned from a position above a predetermined height threshold to a position below the predetermined height threshold. When no transition is detected, the method continues monitoring the position of the object to determine if such transition occurs. When the object transitioned from the position above the predetermined height threshold to the position below the predetermined height threshold, the method proceeds to block 1060. In one aspect, the transitioning between positions may be detected by analyzing which portions of the person are above the height threshold when the person is upright verses which portions of the person are above the height threshold when the person has slipped, tripped, or fallen.

At block 1060, the method 1000 obtains a pose of the object. For example, the method obtains a pose of the object to determine whether or not the pose indicates that the object is standing, bent, lying down, etc.

At block 1070, the method 1000 determines whether or not the object is lying down. When the object is lying down, the method proceeds to block 1080.

At block 1080, the method 1000 sends an alert to one or more user devices of one or more predetermined recipients. The alert indicates that a potential slip, trip or fall event is detected. The alert may be sent as a text, email, etc. When the object is determined to not be lying down, no alert is sent and the method returns to block 1010. The slip, trip or fall event detection may use a learning algorithm to improve the accuracy of the detection.

Figure 11:
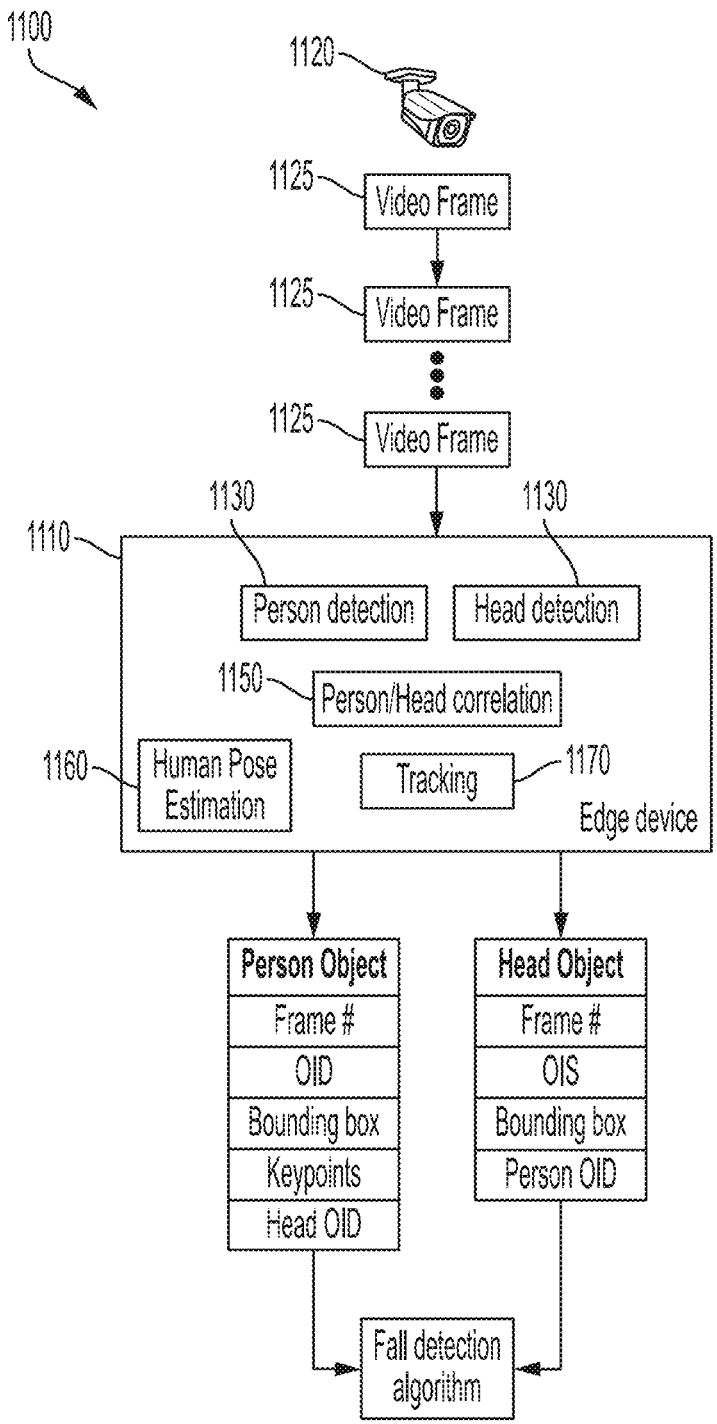
FIG. 11 is a diagram of an implementation of system for detecting a slip, trip or fall event via an edge device, in accordance with exemplary aspects of the present disclosure.

FIG. 11 is a diagram of an implementation of system 1100 for detecting a slip, trip or fall event via an edge device. The detection algorithm is implemented in the edge device 1110. The IP camera 1120 sends video frames 1125 to the edge device 1110. The edge device 1110 includes an object detector 1130, a pre-defined portion detector 1140, a correlator 1150, a pose estimator 1160, and a tracker 1170. For example, the object may be a person, e.g., 301, and the pre-defined portion may be the head of the person, e.g., center head 710 of FIG. 7. Thus, the detector 1130 is used to detect the person and detector 1140 is used to detect the head of the person. Then, the correlator 1150 is used to correlate the person and the respective head. The correlation of the person and the respective head may be based on collecting person objects 1180 and head objects 1190. The pose estimator 1160 is used to estimate the pose of the person and the tracker 1170 is used to track the person and the head as the person moves in the region of interest.

The information gathered from various portions of the edge device 1110 is fed to a fall detection algorithm 1195. The detection of the slip, trip or fall event is then based on the positions of the object and the pre-defined portion.

Figure 12:
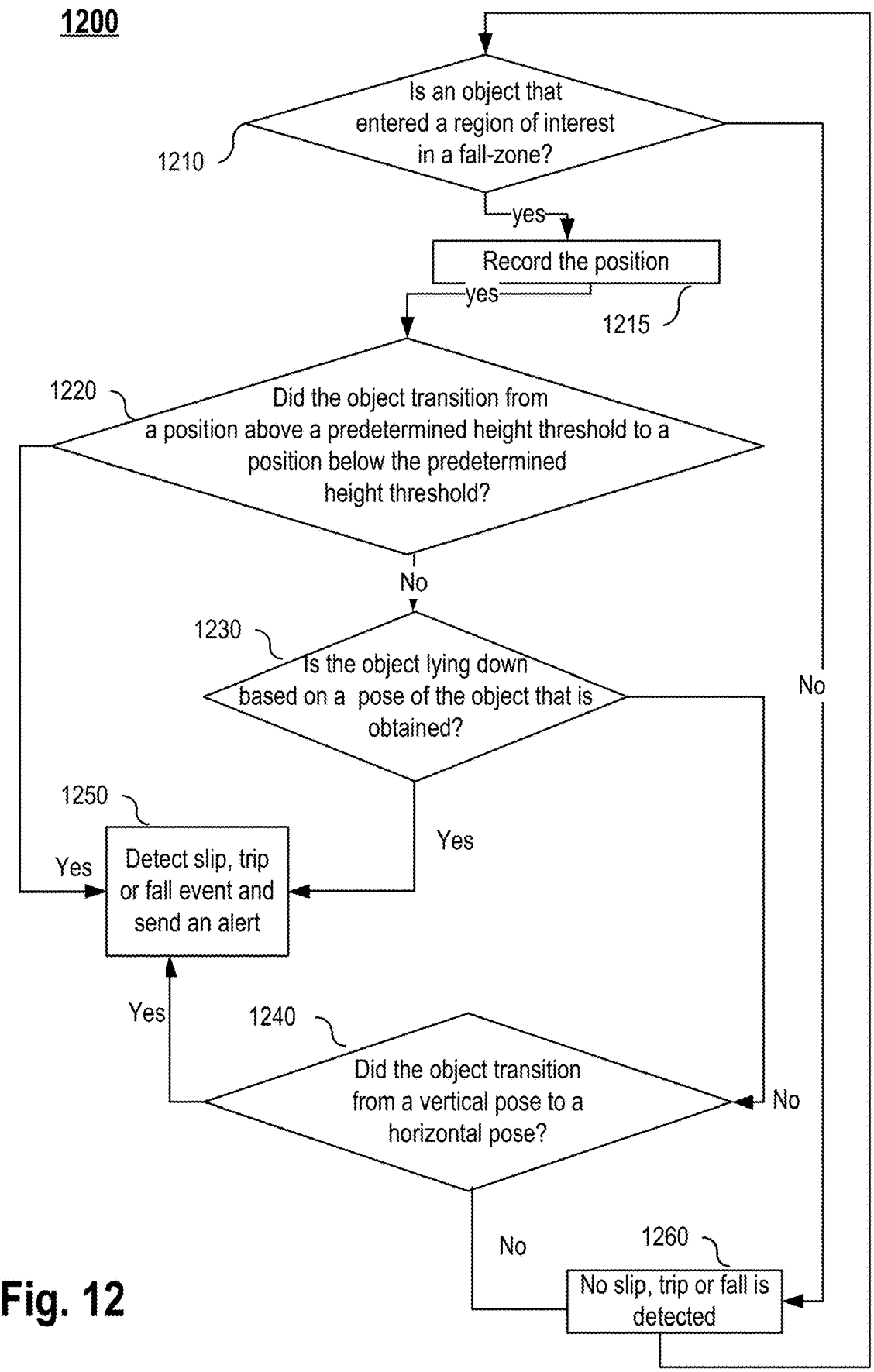
FIG. 12 is another flowchart illustrating a method for detecting a slip, trip or fall event, in accordance with exemplary aspects of the present disclosure.

FIG. 12 is another flowchart illustrating an alternative method 1200 for detecting a slip, trip or fall event. In one aspect, referring to FIG. 2 and FIG. 12, in operation, computing device 200 may perform method 1200 for detecting a slip, trip or fall event by processor 201 and/or memory 202. In one aspect, the slip, trip or fall event detector is implemented in a camera (e.g., an IP camera) or a device, e.g., an edge device, communicatively coupled with the IP camera.

At block 1210, the method 1200 determines whether or not an object that entered a region of interest is in a fall-zone. The tracking of the object may be performed using any known tracking software as known in the art and executed by the processor 201.

The fall-zone is specified by a height threshold or a set of line segments, with each line segment being defined by points that lie in the region of interest. The object is in the fall-zone, when the image of the object in the frame intersects any portion of at least one of the line segments of the fall-zone. When the object is in the fall-zone, the method proceeds to block 1215 to record the position of the object. Otherwise, the method proceeds to block 1260.

At block 1215, method 1200 records the position of the object and proceeds to step 1220.

At block 1220, method 1200 determines whether or not the object transitioned from a position above a predetermined height threshold to a position below the predetermined height threshold. The predetermined height threshold is defined for the fall-zone by the user. For example, the predetermined height threshold may be set as being a given height above ground. In FIG. 3, assuming an average height of an adult, lines 380 and 381 may be 1-2 feet above ground. Thus, the predetermined height threshold would then be the height as set by the user. When the object did not transition from the position above the predetermined height threshold to the position below the predetermined height threshold, the method proceed to block 1230. Otherwise, method proceed to block 1250.

At block 1230, method 1200 obtains a pose of the object and determines whether or not the pose indicates that the object is lying down. For example, if the object is a person, the positon of the head of the person in relation with positions of other portions of the person may be used to ascertain whether or not the person is standing up, sitting down, lying down, etc. When the pose indicates the object is lying down, the method proceeds to block 1250. Otherwise, the method proceeds to block 1240.

At block 1240, method 1200 determines whether the object transitioned from a vertical pose to a horizontal pose. The transitioning may be identified by comparing the images of the object in the plurality of frames captured by the camera. When the object transitioned from a vertical pose to a horizontal pose, the method proceeds to block 1250. Otherwise, the method proceeds to block 1260.

At block 1250, the method detects a slip, trip or fall event and sends an alert. The slip, trip or fall event detection may use a learning algorithm to improve the accuracy of the detection.

At block 1260, the method indicates no slip, trip or fall event is detected. The method then returns to step 1210.

Figure 13:
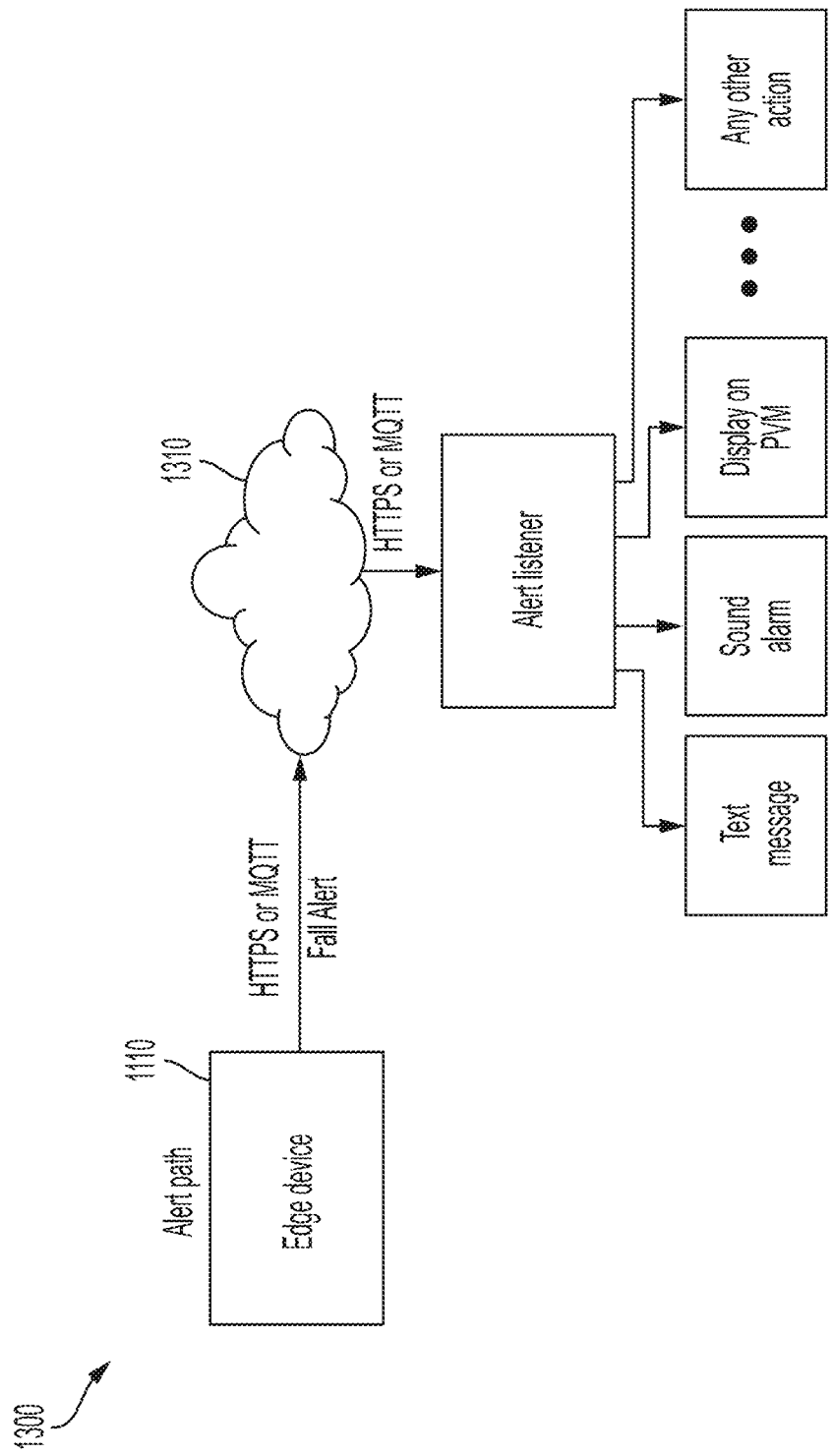
FIG. 13 is a diagram of an example of a path for sending an alert from an edge device to other systems, in accordance with exemplary aspects of the present disclosure.

FIG. 13 is a diagram of an example 1300 of a path for sending an alert from an edge device to other systems. The edge device 1110, as shown in FIG. 11, may send the alert to various other systems via a cloud network 1310. In one aspect, the alert may be sent in Hypertext Transfer Protocol Secure (HTTPS) or Message Queue Telemetry Transport (MQTT) format. The other systems to which the alerts are sent may comprise systems of personnel performing actions based on the received alert. For instance, the alert listeners (personnel) may include listeners receiving text messages, sound alarms, displays on PVM, etc. Therefore, various types of end point devices may receive the alerts in various formats. As described above, the method of the present disclosure relies on a definition of a fall-zone. The fall-zone may be annotated by a user via a GUI interface.

FIG. 14 is a diagram of an example 1400 of an annotation of a fall-zone via a use-camera parameter. The fall zone definition includes width of the configuration image, height of configuration image, number of points in the region of interest, and, for each point, a corresponding (x, y) coordinate within the region of interest. In one aspect, the alert includes a payload. The payload is posted to upper level stacks that take the information, parse as needed, and/or take actions.

FIG. 15 is an example illustrating a payload. The payload of FIG. 15 includes at least an identity of the IP camera, the event type, time, etc.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A vision system, comprising:
   a camera for capturing a plurality of image frames;
   a memory; and
   a processor communicatively coupled with the memory and configured to:
   detect, in the plurality of image frames captured by the camera, when an object enters a region of interest;
   track movements of the object in the region of interest by comparing images of the object in the plurality of image frames;
   determine that the object is in a fall-zone based on the tracking of the movement, the fall-zone being specified by a set of line segments, each line segment being defined by points that lie in the region of interest; and
   when the object is in the fall-zone,
   record the position of the object,
   detect a slip, trip or fall event when the following events occur: the object transitioned from a first position above a predetermined height threshold to a second position below the predetermined height threshold, a pose of the object indicates that the object is lying down, and the object transitioned from a vertical pose to a horizontal pose, and
   send an alert of the detected slip, trip or fall event to one or more user devices of one or more predetermined recipients of the alert.

2. The vision system of claim 1,
   wherein the transitioning of the object from the first position above the predetermined height threshold to the second position below the predetermined height threshold comprises a predefined portion of the object falling below at least one of the line segments of the fall-zone; and
   wherein whether or not the pose of the object indicates that the object is lying down and whether or not the object transitioned from a vertical pose to the horizontal pose are determined based on tracking the movements of the object and movements of at least one portion of the object.

3. The vision system of claim 2, wherein, when the object is a person, the predefined portion of the object comprises a head of the person.

4. The vision system of claim 1, wherein the object is determined as being in the fall-zone when the image of the object in the frame intersects any portion of at least one of the line segments of the fall-zone.

5. The vision system of claim 1, the processor being further configured to:
   receive a command from a user of the vision system, the command being for annotating the fall-zone.

6. The vision system of claim 5, wherein the user issues the command for annotating the fall-zone via a graphical user interface.

7. The vision system of claim 1, wherein the region of interest comprises:
   a full frame as viewed by the camera, or a portion of the full frame preselected by the user of the vision system.

8. The vision system of claim 1, wherein the alert of the slip, trip or fall event comprises a payload directed to another system, the payload including at least an identity of the camera, the type of event, and a time of the event.

9. The vision system of claim 1, wherein the alert of the slip, trip or fall event is sent in an Hypertext Transfer Protocol Secure (HTTPS) or Message Queue Telemetry Transport (MQTT) format via a cloud network.

10. The vision system of claim 1, wherein the one or more user devices of the one or more predetermined recipients of the alert comprises at least one of: an end point device of a user or a server.

11. The vision system of claim 1, the processor being further configured to:
   store, in the memory, at least one of: a type of the slip, trip or fall event, a location of the slip, trip or fall event within the fall-zone, a timestamp of the slip, trip or fall event, and the plurality of image frames captured during a predetermined capture period of the slip, trip or fall event.

12. The vision system of claim 11, wherein the predetermined capture period of the slip, trip or fall event is set by a user of the vision system, where the predetermined capture period specifies at least a time period prior to the slip, trip or fall event.

13. A method for detecting a slip, trip or fall event by a vision system, comprising:

detecting, in a plurality of image frames captured by a camera, when an object enters a region of interest;

tracking movements of the object in the region of interest by comparing images of the object in the plurality of image frames;

determining that the object is in a fall-zone based on the tracking of the movement, the fall-zone being specified by a set of line segments, each line segment being defined by points that lie in the region of interest; and when the object is in the fall-zone,
- recording the position of the object,
- detecting a slip, trip or fall event when the following events occur: the object transitioned from a first position above a predetermined height threshold to a second position below the predetermined height threshold, a pose of the object indicates that the object is lying down, and the object transitioned from a vertical pose to a horizontal pose, and
- sending an alert of the detected slip, trip or fall event to one or more user devices of one or more predetermined recipients of the alert.

14. The method of claim 13,
wherein the transitioning of the object from the first position above the predetermined height threshold to the second position below the predetermined height threshold comprises a predefined portion of the object falling below at least one of the line segments of the fall-zone; and
wherein whether or not the pose of the object indicates that the object is lying down and whether or not the object transitioned from a vertical pose to the horizontal pose are determined based on tracking the movements of the object and movements of at least one portion of the object.

15. The method of claim 14, wherein, when the object is a person, the predefined portion of the object comprises a head of the person.

16. The method of claim 13, wherein the object is determined as being in the fall-zone when the image of the object in the frame intersects any portion of at least one of the line segments of the fall-zone.

17. The method of claim 13, further comprising:
receiving a command from a user of the vision system, the command being for annotating the fall-zone, wherein the user issues the command via a graphical user interface.

18. The method of claim 13, wherein the alert of the slip, trip or fall event comprises a payload directed to another system, the payload including at least an identity of the camera, the type of event, and a time of the event.

19. The method of claim 13, wherein the one or more user devices of the one or more predetermined recipients of the alert comprise at least one of: an end point device of a user or a server.

20. A computer-readable medium storing instructions, for use by a vision system for detecting a slip, trip or fall event in an environment, executable by a processor to perform a method of claim 13.

* * * * *